United States Patent
Bacher et al.

(10) Patent No.: US 7,851,521 B2
(45) Date of Patent: Dec. 14, 2010

(54) HYDROPHOBICIZING WATER-REDISPERSIBLE POLYMER POWDER

(75) Inventors: Andreas Bacher, Burghausen (DE); Hans-Peter Weitzel, Reischach (DE); Franz Jodlbauer, Marktl (DE)

(73) Assignee: Wacker Chemie AG, Munich (DE)

(*) Notice: Subject to any disclaimer, the term of this patent is extended or adjusted under 35 U.S.C. 154(b) by 0 days.

(21) Appl. No.: 11/720,091

(22) PCT Filed: Dec. 1, 2005

(86) PCT No.: PCT/EP2005/012841

§ 371 (c)(1), (2), (4) Date: May 24, 2007

(87) PCT Pub. No.: WO2006/061139

PCT Pub. Date: Jun. 15, 2006

(65) Prior Publication Data

US 2008/0081853 A1    Apr. 3, 2008

(30) Foreign Application Priority Data

Dec. 9, 2004   (DE) ................ 10 2004 059 377

(51) Int. Cl.
*C04B 24/26* (2006.01)
*C08K 5/10* (2006.01)

(52) U.S. Cl. .................... 524/5; 524/317

(58) Field of Classification Search ........... 524/8, 524/5, 317
See application file for complete search history.

(56) References Cited

U.S. PATENT DOCUMENTS

| | | | |
|---|---|---|---|
| 4,098,746 A | 7/1978 | Becker et al. | |
| 4,859,751 A | 8/1989 | Schulze et al. | |
| 5,578,668 A | 11/1996 | Colombet et al. | |
| 5,959,017 A * | 9/1999 | Eck et al. | 524/425 |
| 6,429,239 B1 | 8/2002 | Eck et al. | |
| 6,576,698 B1 | 6/2003 | Weitzel et al. | |
| 6,664,322 B2 | 12/2003 | Weitzel et al. | |
| 6,770,722 B2 | 8/2004 | Weitzel et al. | |
| 6,900,259 B2 | 5/2005 | Klein et al. | |
| 2002/0045692 A1 | 4/2002 | Fiedler et al. | |
| 2003/0164478 A1 | 9/2003 | Fiedler et al. | |
| 2004/0019141 A1* | 1/2004 | Bastelberger et al. | 524/261 |
| 2004/0048961 A1* | 3/2004 | Klein et al. | 524/315 |
| 2006/0254468 A1 | 11/2006 | Bastelberger et al. | |

FOREIGN PATENT DOCUMENTS

| | | |
|---|---|---|
| DE | 100 49 127 A1 | 4/2002 |
| DE | 103 23 205 A1 | 12/2004 |
| EP | 0 149 098 A2 | 7/1985 |
| EP | 0 493 168 A1 | 7/1992 |
| EP | 0 741 760 B1 | 11/1997 |
| EP | 1 110 978 A1 | 6/2001 |
| EP | 1 193 287 A2 | 4/2002 |
| EP | 1 323 752 A1 | 7/2003 |
| EP | 1 352 915 A1 | 10/2003 |
| EP | 1 394 193 A1 | 3/2004 |
| WO | WO-99/42500 | 8/1999 |
| WO | WO-2004/103928 A1 | 12/2004 |

OTHER PUBLICATIONS

Noll et al.: Chemie und Technologie der Silikone, 1968, 2nd Edition, Weinheim is corresponding to "Chemistry and Technology of Silicones".
Houben-Weyl: Methoden der Organischen Chemie, 1987, vol. E20, Stuttgart is corresponding to "Methods of Organic Chemistry".

* cited by examiner

*Primary Examiner*—Milton I Cano
*Assistant Examiner*—John Uselding
(74) *Attorney, Agent, or Firm*—Brooks Kushman P.C.

(57) ABSTRACT

A water redispersible polymer powder with superior hydrophobicizing properties is a copolymer of vinyl acetate, a vinyl ester of an α-branched monocarboxylic acid, an alkyl(meth) acrylate, and a vinyl ester of a long chain unbranched monocarboxylic acid. The polymer is particularly useful as a hydrophobicizing agent for mineral-based chemical building products such as renders, mortars, etc.

22 Claims, No Drawings

HYDROPHOBICIZING WATER-REDISPERSIBLE POLYMER POWDER

CROSS-REFERENCE TO RELATED APPLICATION

This application is the U.S. national phase of PCT Appln. No. PCT/EP2005/012841 filed Dec. 1, 2005 which claims priority to German application DE 10 2004 059 377.9 filed Dec. 9, 2004.

BACKGROUND OF THE INVENTION

1. Field of the Invention

The invention relates to a hydrophobicizing, water-redispersible polymer powder, a process for producing it and its use.

Water-redispersible powders based on homopolymers or copolymers of ethylenically unsaturated monomers are used in the building sector as binders, if appropriate in combination with hydraulically setting binders such as cement. For example, these serve to improve the mechanical strength and the adhesion in building adhesives, renders, mortars and paints. In the case of lime- or cement-bonded building materials such as renders, knifing fillers and building adhesives, there is the additional necessity of protecting these against weathering influences. In the event of rain or snow, the building materials, for example the exterior render, is wetted through due to its capillary activity, which can lead to irreversible damage to the building material. To prevent this, it has long been established practice to hydrophobicize the building materials.

2. Description of the Related Art

The use of redispersion powders based on vinyl chloride-ethylene copolymers for improving hydrophobicity is known from EP 149098 A2. EP 493168 A1 describes the use of redispersion powders modified with silicones for hydrophobicizing building materials. The use of redispersion powders modified with organosilicon compounds for effecting hydrophobicization is known from EP 741760 B1. Hydrophobicization using redispersion powders comprising fatty acid esters is described in DE 10049127 A1, EP 1193287 A2 and EP 1394193 A1. DE-A 10323205 recommends the use of hydrophobicizing, water-redispersible additives based on fatty acid compounds, if desired in combination with organosilicon compounds.

It was an object of the invention to provide a water-redispersible polymer powder based on ethylenically unsaturated monomers which has a hydrophobicizing action due to its polymer composition and is compatible with further hydrophobicizing constituents. These and other objects were achieved through use of copolymers prepared from vinyl acetate, a vinyl ester of an α-branched monocarboxylic acid, and a (meth)acrylate ester, stabilized by a protective colloid.

SUMMARY OF THE INVENTION

The invention provides a hydrophobicizing, water-redispersible polymer powder comprising
a) a polymer comprising
a1) from 50 to 90 parts by weight of vinyl acetate monomer units,
a2) from 5 to 50 parts by weight of vinyl ester monomer units derived from vinyl esters of alpha-branched monocarboxylic acids having from 2 to 20 carbon atoms,
a3) from 1 to 30 parts by weight of (meth)acrylic ester monomer units derived from alcohols having from 1 to 15 carbon atoms,
a4) from 0 to 40 parts by weight of vinyl ester monomer units derived from long-chain monocarboxylic acids having from 10 to 20 carbon atoms,
a5) from 0 to 20 parts by weight of ethylene units, and, if desired,
a6) further auxiliary monomer units, with the parts by weight adding up to 100 parts by weight,
b) from 0.5 to 30% by weight of one or more, water-soluble protective colloids,
c) from 0 to 20% by weight of organosilicon compound,
d) from 0 to 20% by weight of fatty acid or derivatives of fatty acids,
e) from 0 to 30% by weight of antiblocking agent, where the % by weight data are based on the total weight of the polymer a).

Preference is given to copolymerizing a1) from 50 to 70 parts by weight of vinyl acetate per 100 parts by weight of polymer.

DETAILED DESCRIPTION OF THE PREFERRED EMBODIMENT

Preferred vinyl esters of alpha-branched monocarboxylic acids having from 2 to 20 carbon atoms are vinyl pivalate and vinyl esters of alpha-branched monocarboxylic acids having from 9 to 15 carbon atoms (Versatic acids), most preferably VeoVa10$^R$ (trade name of Resolution Products). Preference is given to copolymerizing from 20 to 40 parts by weight of the vinyl ester a2), per 100 parts by weight of polymer.

Preferred (meth)acrylic ester monomer units a3) are the acrylic esters of unbranched or branched alcohols having from 1 to 15 carbon atoms, preferably acrylic esters of unbranched or branched alcohols having from 1 to 8 carbon atoms, most preferably methyl acrylate, n-butyl acrylate, t-butyl acrylate and 2-ethylhexyl acrylate. Preference is given to copolymerizing from 1 to 10 parts by weight of the (meth)acrylic ester a3) per 100 parts by weight of polymer.

Preferred vinyl ester monomer units a4) are those derived from long-chain, unbranched monocarboxylic acids having from 10 to 20 carbon atoms, more preferably units derived from vinyl laurate. Preference is given to copolymerizing from 1 to 40 parts by weight, more preferably from 1 to 10 parts by weight of the vinyl ester a4) per 100 parts by weight of polymer.

If ethylene is copolymerized, the proportion of ethylene a5) is preferably from 5 to 20 parts by weight.

Suitable auxiliary monomers a6) are ethylenically unsaturated monocarboxylic and dicarboxylic acids such as acrylic acid, methacrylic acid; ethylenically unsaturated carboxamides and nitriles, e.g. acrylamide and acrylonitrile; ethylenically unsaturated sulfonic acids or salts thereof, preferably vinylsulfonic acid, 2-acrylamido-2-methylpropanesulfonic acid. Further examples are precrosslinking comonomers such as multiply ethylenically unsaturated comonomers, for example divinyl adipate, diallyl maleate, allyl methacrylate or triallyl cyanurate, or postcrosslinking comonomers, for example N-methylolacrylamide (NMA), alkyl ethers such as the isobutoxy ether or ester of N-methylolacrylamide. Further examples are silicon-functional comonomers such as (meth)acryloxypropyltri(alkoxy)silanes. If auxiliary monomer units are present in the polymer, they are generally present in an amount of from 0.5 to 10 parts by weight.

Greatest preference is given to a polymer a) comprising a1) from 50 to 70 parts by weight of vinyl acetate monomer units, a2) from 20 to 40 parts by weight of monomer units derived from vinyl esters of alpha-branched monocarboxylic acids having from 9 to 15 carbon atoms (Versatic acids), a3) from 1 to 10 parts by weight of monomer units derived from acrylic esters of unbranched or branched alcohols having from 1 to 8 carbon atoms, a4) from 1 to 10 parts by weight of vinyl ester monomer units derived from long-chain monocarboxylic acids having from 10 to 20 carbon atoms, with the parts by weight adding up to 100 parts by weight.

Suitable water-soluble protective colloids b) are partially hydrolyzed and fully hydrolyzed polyvinyl alcohols; polyvinylpyrrolidones; polyvinyl acetals; polysaccharides in water-soluble form, e.g. starches (amylose and amylopectin), celluloses and their carboxymethyl, methyl, hydroxyethyl, hydroxypropyl derivatives; proteins such as casein or caseinate, soybean protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthalene formaldehyde sulfonates, styrene-maleic acid and vinyl ether-maleic acid copolymers.

Preference is given to partially hydrolyzed or fully hydrolyzed polyvinyl alcohols having a degree of hydrolysis of from 80 to 100 mol %, in particular partially hydrolyzed polyvinyl alcohols having a degree of hydrolysis of from 80 to 95 mol % and a Höppler viscosity in 4% strength aqueous solution of from 1 to 30 mPas, preferably from 3 to 15 mPas (Höppler method at 20° C., DIN 53015).

Preference is also given to partially hydrolyzed or fully hydrolyzed, hydrophobically modified polyvinyl alcohols having a degree of hydrolysis of from 80 to 100 mol % and a Höppler viscosity in 4% strength aqueous solution of from 1 to 30 mPas, preferably from 3 to 15 mPas. Examples are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or from 9 to 11 carbon atoms, dialkyl maleates and dialkyl fumarates, e.g. diisopropyl maleate and diisopropyl fumarate, vinyl chloride, vinyl alkyl ethers such as vinyl butyl ether, alpha-olefins having from 2 to 12 carbon atoms, e.g. ethene, propene and decene. The proportion of hydrophobic units is preferably from 0.1 to 10% by weight, based on the total weight of the partially or fully hydrolyzed polyvinyl alcohol. Particular preference is given to partially hydrolyzed or fully hydrolyzed copolymers of vinyl acetate with isopropenyl acetate which have a degree of hydrolysis of from 95 to 100 mol %. It is also possible to use mixtures of the polyvinyl alcohols mentioned.

Greatest preference is given to partially hydrolyzed polyvinyl alcohols having a degree of hydrolysis of from 85 to 94 mol % and a Höppler viscosity in 4% strength aqueous solution of from 3 to 15 mPas (Höppler method at 20° C., DIN 53015), and partially hydrolyzed or fully hydrolyzed copolymers of vinyl acetate with isopropenyl acetate which have a degree of hydrolysis of from 95 to 100 mol %. The polyvinyl alcohols mentioned are obtainable by methods known to those skilled in the art.

Suitable organosilicon compounds c) are silicic esters $Si(OR')_4$, silanes such as tetraorganosilanes $SiR_4$ and organoorganoxysilanes $SiR_n(OR')_{4-n}$ where n=1 to 3, polysilanes preferably having the general formula $R_3Si(SiR_2)_nSiR_3$ where n=0 to 500, organosilanols $SiR_n(OH)_{4-n}$, disiloxanes, oligosiloxanes and polysiloxanes comprising units of the general formula $R_cH_dSi(OR')_e(OH)_fO_{(4-c-d-e-f)/2}$ where c=0 to 3, d=0 to 1, e=0 to 3, f=0 to 3 and the sum c+d+e+f is not more than 3.5 per unit, where the radicals R are in each case identical or different and are branched or unbranched alkyl radicals having from 1 to 22 carbon atoms, cycloalkyl radicals having from 3 to 10 carbon atoms, alkylene radicals having from 2 to 4 carbon atoms, and aryl, aralkyl, alkylaryl radicals having from 6 to 18 carbon atoms, and R' are identical or different alkyl radicals and alkoxyalkylene radicals each having from 1 to 4 carbon atoms, preferably methyl and ethyl, where the radicals R and R' may also be substituted by halogens such as Cl, by ether, thioether, ester, amide, nitrile, hydroxyl, amine, carboxyl, sulfonic acid, carboxylic anhydride and carbonyl groups, and in the case of the polysilanes, R can also have the meaning OR'. Also suitable are carbosilanes, polycarbosilanes, carbosiloxanes, polycarbosiloxanes, polysilylenedisiloxanes.

Preferred components c) are tetramethoxysilane, tetraethoxysilane, methyltripropoxysilane, methyltri(ethoxyethoxy)silane, vinyltri(methoxyethoxy)silane, (meth)acryloxypropyltrimethoxysilane, (meth)acryloxypropyltriethoxysilane, γ-chloropropyltriethoxysilane, β-nitriloethyltriethoxysilane, γ-mercaptopropyltrimethoxysilane, γ-mercaptopropyltriethoxysilane, phenyltriethoxysilane, isooctyltriethoxysilane, n-octyltriethoxysilane, hexadecyltriethoxysilane, dipropyldiethoxysilane, methylphenyldiethoxysilane, diphenyldimethoxysilane, methylvinyltri(ethoxyethoxy)silane, tetramethyldiethoxydisilane, trimethyltrimethoxydisilane, trimethyltriethoxydisilane, dimethyltetramethoxydisilane, dimethyltetraethoxydisilane, methylhydrogenpolysiloxanes capped with trimethylsiloxy end groups, copolymers of dimethylsiloxane and methylhydrogensiloxane units capped with trimethylsiloxy end groups, dimethylpolysiloxanes and dimethylpolysiloxanes having Si—OH groups in the terminal units. Greatest preference is given to the organoorganoxysilanes $SiR_n(OR')_{4-n}$, where n=1 to 3, in particular isooctyltriethoxysilane, n-octyltriethoxysilane, hexadecyltriethoxysilane.

The component c) is preferably used in an amount of from 0.1 to 20% by weight, more preferably from 1 to 10% by weight, in each case based on the polymer a). The organosilicon compounds can be prepared by methods as described in Noll, Chemie and Technologie der Silicone, 2nd edition 1968, Weinheim, and in Houben-Weyl, Methoden der organischen Chemie, Volume E20, Georg Thieme Verlag, Stuttgart (1987).

Suitable components d) are generally fatty acids and fatty acid derivatives which liberate fatty acid or the corresponding fatty acid anion under alkaline conditions, preferably pH>8. Preference is given to fatty acid compounds from the group consisting of fatty acids having from 8 to 22 carbon atoms, their metal soaps, their amides and their esters with monohydric alcohols having from 1 to 14 carbon atoms, with glycol, with polyglycol, with polyalkylene glycol, with glycerol, with monoethanolamine, diethanolamine or triethanolamine, with monosaccharides.

Suitable fatty acids are branched and unbranched, saturated and unsaturated fatty acids each having from 8 to 22 carbon atoms. Examples are lauric acid (n-dodecanoic acid), myristic acid (n-tetradecanoic acid), palmitic acid (n-hexadecanoic acid), stearic acid (n-octadecanoic acid) and oleic acid (9-dodecenoic acid).

Suitable metal soaps are those of the abovementioned fatty acids with metals of the $1^{st}$ to $3^{rd}$ main groups and the $2^{nd}$ transition group of the PTE, and with ammonium compounds $NX_4^+$, where the radicals X are identical or different and are each H, a $C_1$-$C_8$-alkyl radical or a $C_1$-$C_8$-hydroxyalkyl radical. Preference is given to metal soaps with lithium, sodium, potassium, magnesium, calcium, aluminum, zinc and the ammonium compounds.

Suitable fatty acid amides are the fatty acid amides obtainable from monoethanolamine or diethanolamine and the abovementioned $C_8$-$C_{22}$-fatty acids.

Fatty acid esters suitable as component d) are the $C_1$-$C_{14}$-alkyl esters and -alkylaryl esters of the abovementioned $C_8$-$C_{22}$-fatty acids, preferably methyl, ethyl, propyl, butyl, ethylhexyl esters and the benzyl esters.

Suitable fatty acid esters are also the monoglycol, diglycol and polyglycol esters of the $C_8$-$C_{22}$-fatty acids. Further suitable fatty acid esters are the monoesters and diesters of polyglycols and/or polyalkylene glycols having up to 20 oxyalkylene units, e.g. polyethylene glycol and polypropylene glycol.

Also suitable are the monoesters, diesters and triesters of glycerol with the abovementioned $C_8$-$C_{22}$-fatty acids, and also the monoesters, diesters and triesters of monoethanolamine, diethanolamine and triethanolamine with the abovementioned $C_8$-$C_{22}$-fatty acids.

Also suitable are the fatty acid esters of sorbitol and mannitol.

Particular preference is given to the $C_1$-$C_{14}$-alkyl esters and alkylaryl esters of lauric acid and of oleic acid, monoglycol and diglycol esters of lauric acid and of oleic acid and also the monoesters, diesters and triesters of glycerol with lauric acid and with oleic acid.

The abovementioned fatty acids and fatty acid derivatives can be used alone or in admixture. In general, the component d) is used in an amount of from 1 to 20% by weight, based on the polymer a).

Suitable antiblocking agents e) are Ca carbonate, Mg carbonate, talc, gypsum, milled clays, kaolins such as metakaolin and also finely milled aluminum silicates, kieselguhr, colloidal silica gel, pyrogenic silicon dioxide, in each case having particle sizes in the range of preferably from 10 nm to 10 µm.

The redispersible polymer powder is produced in a manner known per se by means of free-radically initiated emulsion polymerization in aqueous medium and subsequent drying of the resulting aqueous polymer dispersion. The emulsion polymerization is carried out in the presence of protective colloid b) and/or emulsifier. Preference is given to carrying out the stabilization exclusively with protective colloid b). The aqueous polymer dispersions obtainable in this way generally have a solids content of from 25 to 70% by weight, preferably from 45 to 65% by weight.

Drying can be carried out, for example, by means of fluidized-bed drying, thin layer drying (roller drying), freeze drying or spray drying. Preference is given to spray drying. Spray drying is generally carried out after addition of further protective colloid b) as atomization aid. If the polymer powder is to further comprise organosilicon compound c) and/or fatty acid (derivatives) d), these are preferably added to the polymer dispersion before it is dried. The addition of the antiblocking agent e) is preferably carried out while the powder is still suspended in the drying gas. Spray drying is carried out in customary spray drying units, with atomization being able to be effected by means of single-fluid, two-fluid or multifluid nozzles or a rotary atomizer disk. The outlet temperature is generally selected in the range from 45° C. to 120° C., preferably from 60° C. to 90° C., depending on the unit, the Tg of the resin and the desired degree of drying.

The hydrophobicizing additives can be used in a wide variety of fields of application, for example in building chemical products, if appropriate in combination with hydraulically setting binders such as cements (portland cement, alumina cement, pozzolanic cement, slag cement, magnesia cement, phosphate cement) or water glass, or in $CaSO_4$-containing compositions, lime-containing compositions or cement-free and polymer-bonded compositions, for the production of building adhesives, in particular tile adhesives and thermal insulation adhesives, renders, knifing fillers, flooring screeds, self-leveling compositions, sealing slurries, jointing mortars and paints. In general, the hydrophobicizing redispersion powder is used in an amount of from 0.1 to 10% by weight, based on the total weight of the formulation to be hydrophobicized (without water).

The hydrophobicizing redispersion powder is, owing to the excellent hydrophobicity and the simultaneously high adhesion to polystyrene, particularly advantageous in building adhesives and coatings for thermal insulation composite systems (TICS).

The following examples illustrate the invention:

EXAMPLE 1

66 kg of deionized water, 105 kg of a 20% strength aqueous solution of a polyvinyl alcohol having a degree of hydrolysis of 88 mol % and a Höppler viscosity of 4 mPas and 113.8 kg of vinyl acetate, 52.7 kg of VeoVa10 and 8.8 kg of butyl acrylate were placed in a 600 l reactor. The pH was set to 4.5-5.5 by means of formic acid. The mixture was subsequently heated to 65° C.

To start the polymerization, the initiator solutions, namely a 1.5% strength aqueous t-butyl hydroperoxide solution and a 1.5% strength aqueous Brüggolith solution, were metered in at rates of 960 g/h and 1400 g/h, respectively. The internal temperature was restricted to 75° C. by means of external cooling. The metered addition was stopped 30 minutes after the mixture had attained a solids content of 52%. After the reaction had been ended, the polymer was after-polymerized to remove residual monomers. To carry out the after-polymerization, 300 g of t-butyl hydroperoxide as a 10% strength aqueous solution and 1300 g of Brüggolith as a 10% strength aqueous solution were added in succession. The mixture was cooled and subsequently dispensed via a 250 µm sieve.

The dispersion was admixed with 5% by weight (solid/solid) of polyvinyl alcohol having a degree of hydrolysis of 88 mol % and a Höppler viscosity of 4 mPas and with 1% by weight (solid/solid) of polyvinyl alcohol having a degree of hydrolysis of 88 mol % and a Höppler viscosity of 13 mPas. In addition, 6% by weight of isooctyltriethoxysilane were added and the mixture was subsequently diluted with water to a viscosity of 250 mPas. The dispersion was then spray dried by means of a pressure nozzle. Air which had been precompressed to 4 bar served as atomization component, and the droplets formed were dried in cocurrent by means of air heated to 125° C. The resulting dry powder was admixed with 10% by weight of commercial antiblocking agent (kaolin).

EXAMPLE 2

The powder was produced by a method analogous to Example 1, but 8.8 kg of vinyl laurate were additionally placed in the reactor at the beginning and only 105 kg of vinyl acetate were used.

EXAMPLE 3

The powder was produced by a method analogous to Example 1, but 17.2 kg of butyl acrylate were placed in the reactor at the beginning and only 105 kg of vinyl acetate were used.

EXAMPLE 4

The powder was produced by a method analogous to Example 1 using 17.2 kg of butyl acrylate, 17.2 kg of vinyl laurate and 87.4 kg of vinyl acetate.

EXAMPLE 5

The powder was produced by a method analogous to Example 1, but 30 bar of ethylene were injected and only 105 kg of vinyl acetate were used.

COMPARATIVE EXAMPLE 6

The powder was produced by a method analogous to Example 1, but no butyl acrylate was used.

Testing of the water absorption of a rendering mortar layer:

The following mortar formulation served as basis of the experiments:

| | |
|---|---|
| White cement | 70.9 parts by weight |
| Calcium hydroxide | 68.1 parts by weight |
| Omya BL | 70.9 parts by weight |
| Titanium dioxide | 10.9 parts by weight |
| Cellulose fibers | 4.4 parts by weight |
| Calcilit 500 | 459.9 parts by weight |
| Calcilit 0.5-1.0 | 286.1 parts by weight |
| Cellulose ethers | 1.6 parts by weight |
| Bentonite | 1.7 parts by weight |
| Polymer powder | 25.0 parts by weight |
| Total: | 999.5 parts by weight |

The mortar was mixed with 25 ml of make-up water per 100 g of dry mortar and was subsequently applied in a thickness of 4 mm to a porous concrete slab. After the mortar layer had cured, the uncoated sides of the porous concrete slab were sealed by means of a varnish. The test specimen was conditioned under standard conditions (23° C./50% atmospheric humidity) for 7 days. This test specimen was subsequently placed in water with the mortar layer downward so that it was immersed in the water to a depth of 1 cm.

Over the course of time, the water penetrates through the render layer into the porous concrete slab. The amount of water which penetrates in can be determined by weighing. The porous concrete slab serves as a suction reservoir. Since the porous concrete slab in its uncoated state absorbs water many times as quickly as the rendering mortar, the amount of water absorbed per unit time is determined mainly by the rendering mortar layer.

The water absorption is expressed by the water penetration number WPN. This is the quotient obtained by dividing the water absorption per square meter determined after a suction time of 24 hours by the square root of the suction time.

TABLE 1

| WPN | Ex. 1 | Ex. 2 | Ex. 3 | Ex. 4 | Ex. 5 | C. Ex. 6 |
|---|---|---|---|---|---|---|
| $kg/m^2h^{0.5}$ | 0.35 | 0.20 | 0.33 | 0.15 | 0.35 | 0.50 |

Examples 2 and 4 show the synergistic effect in terms of hydrophobicization obtained by copolymerization of long-chain vinyl esters in combination with (meth)acrylic esters. Compared to conventional vinyl acetate copolymers (C.Ex. 6), a considerable improvement in the water-repelling effect is obtained by means of the system vinyl acetate-VeoVa-butyl acrylate (Ex. 1, 3, 5), and a significant further increase in this can be achieved by copolymerization of long-chain vinyl esters (Ex. 2, 4).

The invention claimed is:

1. A hydrophobicizing, water-redispersible polymer powder comprising:
   a) a polymer prepared from monomers comprising
      a1) from 50 to 90 parts by weight of vinyl acetate monomer units,
      a2) from 5 to 50 parts by weight of vinyl ester monomer units derived from vinyl esters of alpha-branched monocarboxylic acids having up to 20 carbon atoms inclusive,
      a3) from 1 to 30 parts by weight of (meth)acrylic ester monomer units derived from alcohols having from 1 to 15 carbon atoms,
      a4) from 1 to 40 parts by weight of vinyl ester monomer units derived from long-chain unbranched monocarboxylic acids having from 10 to 20 carbon atoms,
      a5) from 0 to 20 parts by weight of ethylene units,
      a6) optionally, up to 10 parts by weight of auxiliary monomer units, wherein the parts by weight of monomeric units a1) through a6) of polymer a) add up to 100 parts by weight,
   b) from 0.5 to 30% by weight of one or more, water-soluble protective colloids,
   c) from 0 to 20% by weight of organosilicon compound(s),
   d) from 0 to 20% by weight of fatty acid(s) or derivatives thereof, and
   e) from 0 to 30% by weight of antiblocking agent, where the % by weight data are based on the total weight of the polymer a).

2. The hydrophobicizing, water-redispersible polymer powder composition of claim 1 comprising from 20 to 40 parts by weight of vinyl ester monomer units a2) derived from vinyl esters of alpha-branched monocarboxylic acids having from 9 to 15 carbon atoms.

3. The hydrophobicizing, water-redispersible polymer powder composition of claim 2 comprising from 1 to 10 parts by weight of acrylic ester monomer units a3) derived from acrylic esters of unbranched or branched alcohols having from 1 to 15 carbon atoms.

4. The hydrophobicizing, water-redispersible polymer powder composition of claim 3, comprising from 5 to 20 parts by weight of ethylene monomer units.

5. The hydrophobicizing, water-redispersible polymer powder composition of claim 2, comprising from 5 to 20 parts by weight of ethylene monomer units.

6. The hydrophobicizing, water-redispersible polymer powder composition of claim 1 comprising from 1 to 10 parts by weight of acrylic ester monomer units a3) derived from acrylic esters of unbranched or branched alcohols having from 1 to 15 carbon atoms.

7. The hydrophobicizing, water-redispersible polymer powder composition of claim 1, comprising from 5 to 20 parts by weight of ethylene monomer units.

8. The hydrophobicizing, water-redispersible polymer powder composition of claim 1 wherein a polymer a) comprises a1) from 50 to 70 parts by weight of vinyl acetate monomer units, a2) from 20 to 40 parts by weight of monomer units derived from vinyl esters of alpha-branched monocarboxylic acids having from 9 to 15 carbon atoms, a3) from 1 to 10 parts by weight of monomer units derived from acrylic esters of unbranched or branched alcohols having from 1 to 8 carbon atoms, and a4) from 1 to 10 parts by weight of vinyl ester monomer units derived from long-chain, unbranched monocarboxylic acids having from 10 to 20 carbon atoms.

9. The hydrophobicizing, water-redispersible polymer powder composition of claim 1, comprising partially hydrolyzed or fully hydrolyzed, optionally hydrophobically modified polyvinyl alcohols having a degree of hydrolysis of from 80 to 100 mol % (determined in accordance with DIN 53401) and a Hoppler viscosity in 4% strength aqueous solution of from 1 to 30 mPas (Hoppler method at 20°C., DIN 53015) as a protective colloid b).

10. The hydrophobicizing, water-redispersible polymer powder composition of claim 1, comprising from 0.1 to 20% by weight, based on the polymer a), of one or more organosilicon compounds c) selected from the group consisting of silicic esters, silanes, polysilanes, organosilanols, disiloxanes, oligosiloxanes, polysiloxanes, carbosilanes, polycarbosilanes, carbosiloxanes, polycarbosiloxanes, and polysilylenedisiloxanes.

11. The hydrophobicizing, water-redispersible polymer powder composition of claim 1, comprising from 0.1 to 20% by weight, based on the polymer a), of one or more compounds d) selected from the group consisting of fatty acids having from 8 to 22 carbon atoms, their metal soaps, their amides, and their esters with monohydric alcohols having from 1 to 14 carbon atoms, with glycol, with polyglycol, with polyalkylene glycol, with glycerol, with monoethanolamine, diethanolamine and triethanolamine, and with monosaccharides.

12. A process for producing hydrophobicizing, water-redispersible polymer powder compositions of claim 1, comprising polymerizing by free-radically initiated emulsion polymerization in an aqueous medium and subsequently drying the resulting aqueous polymer dispersion.

13. The polymer powder of claim 1, wherein component (c) is not present.

14. The polymer powder of claim 1, wherein component (d) is not present.

15. The polymer powder of claim 1, wherein neither component (c) nor component (d) are present.

16. The polymer powder of claim 1, wherein no component a5) is present.

17. A chemical building product comprising at least one polymer of claim 1, and at least one hydraulically settable inorganic binder selected from the group consisting of cement, water, glass, gypsum, and lime.

18. The product of claim 17 which is a building adhesive, render, knifing filler, flooring screed, self-leveling composition, sealing slurry, jointing mortar, or paint.

19. The composition of claim 17, further comprising portland cement.

20. The composition of claim 19, further comprising calcium carbonate.

21. A hydrophobicizing, water-redispersible polymer powder consisting essentially of:
   a) a polymer prepared from monomers comprising
      a1) from 50 to 90 parts by weight of vinyl acetate monomer units,
      a2) from 5 to 50 parts by weight of vinyl ester monomer units derived from vinyl esters of alpha-branched monocarboxylic acids having up to 20 carbon atoms inclusive,
      a3) from 1 to 30 parts by weight of (meth)acrylic ester monomer units derived from alcohols having from 1 to 15 carbon atoms,
      a4) from 1 to 40 parts by weight of vinyl ester monomer units derived from long-chain unbranched monocarboxylic acids having from 10 to 20 carbon atoms,
      a5) from 0 to 20 parts by weight of ethylene units,
      a6) optimally, auxiliary monomer units, wherein the parts by weight add up to 100 parts by weight,
   b) from 0.5 to 30% by weight of one or more, water-soluble protective colloids,
   c) from 0 to 20% by weight of organosilicon compound(s),
   d) from 0 to 20% by weight of fatty acid(s) or derivatives thereof, and
   e) from 0 to 30% by weight of antiblocking agent, where the % by weight data are based on the total weight of the polymer a).

22. A hydrophobicizing, water-redispersible polymer powder consisting of:
   a) a polymer prepared from monomers comprising
      a1) from 50 to 90 parts by weight of vinyl acetate monomer units,
      a2) from 5 to 50 parts by weight of vinyl ester monomer units derived from vinyl esters of alpha-branched monocarboxylic acids having up to 20 carbon atoms inclusive,
      a3) from 1 to 30 parts by weight of (meth)acrylic ester monomer units derived from alcohols having from 1 to 15 carbon atoms,
      a4) from 1 to 40 parts by weight of vinyl ester monomer units derived from long-chain unbranched monocarboxylic acids having from 10 to 20 carbon atoms,
      a5) from 0 to 20 parts by weight of ethylene units,
      a6) optimally, auxiliary monomer units, wherein the parts by weight add up to 100 parts by weight,
   b) from 0.5 to 30% by weight of one or more, water-soluble protective colloids,
   c) from 0 to 20% by weight of organosilicon compound(s),
   d) from 0 to 20% by weight of fatty acid(s) or derivatives thereof, and
   e) from 0 to 30% by weight of antiblocking agent, where the % by weight data are based on the total weight of the polymer a).

* * * * *